(12) United States Patent
Mallik et al.

(10) Patent No.: US 10,250,678 B2
(45) Date of Patent: Apr. 2, 2019

(54) HYBRID MODES FOR PEER DISCOVERY

(75) Inventors: Siddhartha Mallik, San Diego, CA (US); Ravi Palanki, San Diego, CA (US); Durga Prasad Malladi, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 13/046,157

(22) Filed: Mar. 11, 2011

(65) Prior Publication Data
US 2012/0011247 A1    Jan. 12, 2012

Related U.S. Application Data

(60) Provisional application No. 61/362,002, filed on Jul. 7, 2010.

(51) Int. Cl.
| | | |
|---|---|---|
| G06F 15/173 | (2006.01) | |
| H04L 29/08 | (2006.01) | |
| H04W 8/00 | (2009.01) | |

(52) U.S. Cl.
CPC ........ *H04L 67/104* (2013.01); *H04L 67/1068* (2013.01); *H04W 8/005* (2013.01); *H04L 67/1063* (2013.01)

(58) Field of Classification Search
CPC .... H04W 8/005; H04W 84/18; H04L 67/104; H04L 67/1063; H04L 67/1068;
(Continued)

(56) References Cited

U.S. PATENT DOCUMENTS 7,085,814 B1 *  8/2006  Gandhi ............... H04L 29/1232
                                                709/208
7,272,315 B1 *  9/2007  Au ....................... H04J 3/1694
                                                398/63
(Continued)

FOREIGN PATENT DOCUMENTS

| EP | 2015606 | 1/2009 |
|---|---|---|
| JP | 2009521191 A | 5/2009 |

(Continued)

OTHER PUBLICATIONS

Campo, C et al 'PDP: A Lightweight Discovery Protocol for Local-Scope Interactions in Wireless Ad Hoc Networks', Computer Networks, vol. 50, No. 17, Elsevier Science Publishers. 2006. Available online Jan. 19, 2006.*

(Continued)

*Primary Examiner* — Shean Tokuta
(74) *Attorney, Agent, or Firm* — Clint R. Morin; Arent Fox

(57) ABSTRACT

Techniques for performing peer discovery in a wireless network are described. A device may perform peer discovery to detect and identify other devices of interest. In an aspect, the device may perform peer discovery based on a hybrid mode that includes autonomous peer discovery and network-assisted peer discovery. In another aspect, the device may perform peer discovery based on a push mode and a pull mode. For the push mode, the device may occasionally transmit and/or receive a peer detection signal. For the pull mode, the device may transmit and/or receive a peer discovery request when triggered. In yet another aspect, the device may perform event-triggered peer discovery (e.g., for the pull mode). In yet another aspect, the device may perform peer discovery using both a downlink spectrum and an uplink spectrum. In yet another aspect, the device may (Continued)

transmit a peer detection signal in a manner to improve detection and/or increase payload.

38 Claims, 7 Drawing Sheets

(58) Field of Classification Search
CPC ... H04L 29/06; H04L 29/12113; H04L 41/12; H04L 61/1541; H04L 69/24
USPC .................. 370/254; 709/203, 224, 227, 228
See application file for complete search history.

(56) References Cited

U.S. PATENT DOCUMENTS

| | | | |
|---|---|---|---|
| 7,565,432 B2* | 7/2009 | Huitema | H04L 29/12066 709/226 |
| 7,783,777 B1* | 8/2010 | Pabla | G06F 17/30206 709/238 |
| 8,059,027 B2* | 11/2011 | Khosravy | G01S 19/25 342/357.25 |
| 8,391,260 B1* | 3/2013 | Kopikare | H04W 8/005 370/338 |
| 8,428,079 B1* | 4/2013 | Lambert | H04W 8/005 370/461 |
| 8,429,396 B1* | 4/2013 | Trivedi | H04L 63/04 709/223 |
| 2003/0005092 A1* | 1/2003 | Nelson | G06F 21/88 709/220 |
| 2003/0126199 A1* | 7/2003 | Kadri | H04L 29/06 709/203 |
| 2003/0187931 A1* | 10/2003 | Olsen | H04L 29/06 709/205 |
| 2004/0019685 A1* | 1/2004 | Morita | H04L 29/06027 709/227 |
| 2004/0044892 A1* | 3/2004 | Dorner | G09B 5/00 713/168 |
| 2004/0133640 A1* | 7/2004 | Yeager | G06F 9/4862 709/204 |
| 2005/0157660 A1* | 7/2005 | Mandato | H04L 29/06 370/254 |
| 2006/0142034 A1* | 6/2006 | Wentink | H04W 8/005 455/515 |
| 2006/0153085 A1* | 7/2006 | Willins | H04W 24/04 370/242 |
| 2006/0153208 A1* | 7/2006 | Costanzo | H04L 41/046 370/401 |
| 2007/0211678 A1* | 9/2007 | Li | H04L 5/0035 370/338 |
| 2007/0220142 A1* | 9/2007 | Moorer | G06F 11/0709 709/224 |
| 2007/0226360 A1* | 9/2007 | Gupta | H04L 67/16 709/230 |
| 2007/0286136 A1* | 12/2007 | Rittle | H04W 8/005 370/338 |
| 2008/0031208 A1* | 2/2008 | Abhishek | H04W 52/0225 370/338 |
| 2008/0174403 A1* | 7/2008 | Wolpert | G07C 9/00103 340/5.61 |
| 2008/0192666 A1* | 8/2008 | Koskan | H04W 52/0261 370/311 |
| 2008/0267175 A1* | 10/2008 | Mo | H04L 45/02 370/357 |
| 2008/0272906 A1* | 11/2008 | Breed | B60C 11/24 340/539.11 |
| 2009/0016250 A1* | 1/2009 | Li et al. | 370/310.1 |
| 2009/0017783 A1* | 1/2009 | Li | H04W 52/325 455/296 |
| 2009/0074094 A1* | 3/2009 | Palanki | H04L 27/10 375/260 |
| 2009/0232143 A1* | 9/2009 | Li | H04W 72/1242 370/395.3 |
| 2009/0285119 A1 | 11/2009 | Horn et al. | |
| 2009/0287827 A1* | 11/2009 | Horn et al. | 709/227 |
| 2009/0323648 A1* | 12/2009 | Park | H04W 8/005 370/338 |
| 2009/0327395 A1* | 12/2009 | Park et al. | 709/202 |
| 2010/0110929 A1* | 5/2010 | Li | H04B 1/7143 370/254 |
| 2010/0118834 A1* | 5/2010 | Kalhan | H04W 48/08 370/336 |
| 2010/0128701 A1* | 5/2010 | Nagaraja | H04W 76/10 370/338 |
| 2010/0165882 A1* | 7/2010 | Palanki et al. | 370/254 |
| 2010/0262717 A1* | 10/2010 | Critchley | H04L 12/42 709/251 |
| 2011/0082939 A1* | 4/2011 | Montemurro | H04W 76/14 709/227 |
| 2011/0153789 A1* | 6/2011 | Vandwalle | H04W 48/08 709/221 |
| 2011/0170511 A1* | 7/2011 | Chen | H04W 72/02 370/329 |
| 2011/0296125 A1* | 12/2011 | Shaikh | G06F 21/30 711/159 |
| 2012/0026941 A1* | 2/2012 | Ahmad | H04W 48/16 370/328 |
| 2012/0115540 A1* | 5/2012 | Kurose | H04B 1/3805 455/525 |
| 2013/0286942 A1* | 10/2013 | Bonar | H04B 7/0689 370/328 |

FOREIGN PATENT DOCUMENTS

| | | |
|---|---|---|
| WO | WO-2007075968 A2 | 7/2007 |
| WO | WO-2009142629 A2 | 11/2009 |
| WO | WO2009158656 | 12/2009 |

OTHER PUBLICATIONS

Campo C et al: "PDP: A lightweight discovery protocol for local-scope interactions in wireless ad hoc networks", Computer Networks, Elsevier Science Publishers B.V., Amsterdam, NL, vol. 50, No. 17, Dec. 5, 2006 (Dec. 5, 2006), pp. 3264-3283, XP025182668, ISSN: 1389-1286, DOI: DOI:10.1016/J.COMNET.2005.12.007 [retrieved on Dec. 5, 2006].

Helal, et al., "Konark—a service discovery and delivery protocol for ad-hoc networks", 2003 IEEE Wireless Communications and Networking Conference Record : Mar. 16-20, 2003, New Orleans, Louisiana, USA, IEEE Operations Center, Piscataway, NJ, vol. 3, Mar. 16, 2003 (Mar. 16, 2003), pp. 2107-2113, XP010640094, DOI: 10.1109/WCNC.2003.1200712 ISBN: 978-0-7803-7700-4.

International Search Report and Written Opinion—PCT/US2011/043226—ISA/EPO—dated Dec. 14, 2011.

Liu, et al., "A practical hybrid mechanism for peer discovery", Intelligent Signal Processing and Communication Systems, 2007, ISPACS 2007 International Symposium on, IEEE, PI, Nov. 1, 2007 (Nov. 1, 2007), pp. 706-709, XP031211629, ISBN: 978-1-4244-1446-8.

Poon, et al., "Rheeve: a plug-n-play peer-to-peer computing platform", Distributed Computing Systems Workshops, 2002, proceedings, 22ND International Conference on Jul. 2-5, 2002, Piscataway, NJ, USA,IEEE, Jul. 2, 2002 (Jul. 2, 2002), pp. 706-711, XP010601603, ISBN: 978-0-7695-1588-5.

Cigno R.L., et al., "On Some Fundamental Properties of P2P Push/Pull Protocols", ICCE2008, Jun. 4-6, 2008, pp. 67-73.

European Search Report—EP13174029—Search Authority—The Hague—dated Jul. 11, 2017.

European Search Report—EP13174039—Search Authority—The Hague—dated Sep. 26, 2017.

European Search Report—EP13174032—Search Authority—The Hague—dated Oct. 11, 2017.

* cited by examiner

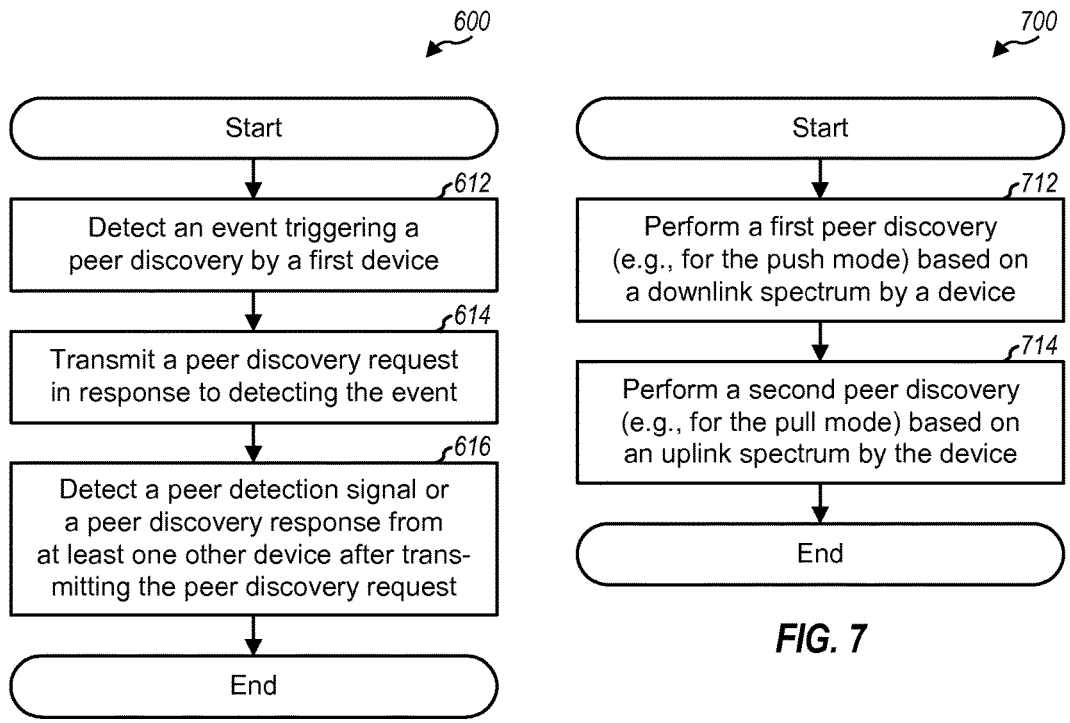
FIG. 6
FIG. 7
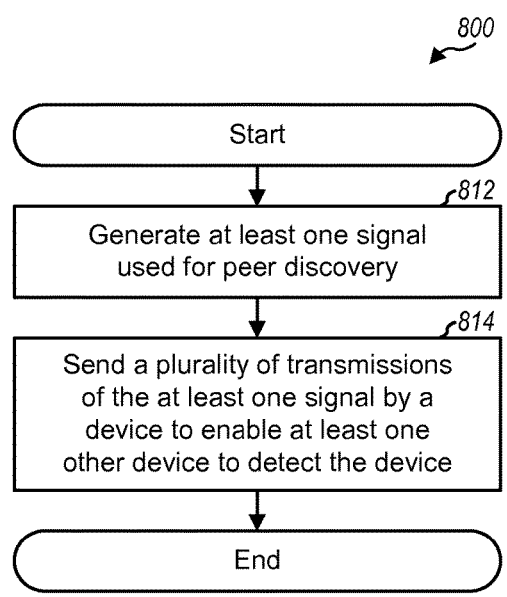
FIG. 8

HYBRID MODES FOR PEER DISCOVERY

The present application claims priority to provisional U.S. Application Ser. No. 61/362,002, entitled "HYBRID MODES FOR PEER DISCOVERY," filed Jul. 7, 2010, and incorporated herein by reference in its entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of devices. A device may communicate with a base station via the downlink and uplink. The downlink (or forward link) refers to the communication link from the base station to the device, and the uplink (or reverse link) refers to the communication link from the device to the base station. The device may also be able to communicate peer-to-peer with other devices. It may be desirable to efficiently support P2P communication between devices.

SUMMARY

Techniques for performing peer discovery in a wireless network are described herein. A device may perform peer discovery to detect and identify other devices of interest. It may be desirable to perform peer discovery such that devices of interest can be efficiently detected while reducing power consumption.

In an aspect, a device may perform peer discovery based on a hybrid mode that includes autonomous peer discovery and network-assisted peer discovery. In one design, the device may perform a first peer discovery autonomously, for example, by (i) occasionally (e.g., periodically or aperiodically) transmitting a peer detection signal to enable at least one other device to detect the device and/or (ii) occasionally detecting a peer detection signal from at least one other device. The device may also perform a second peer discovery with network assistance. For network-assisted peer discovery, the device may register with a network entity (e.g., a directory agent) and may thereafter receive a notification of a match between the device and at least one other device. The device may then perform peer discovery in response to receiving the match notification. The device may also perform peer discovery with network assistance in other manners.

In another aspect, a device may perform peer discovery based on a "push" mode and a "pull" mode. In one design of the push mode, the device may occasionally transmit a peer detection signal and/or occasionally detect a peer detection signal from at least one other device. In one design of the pull mode, the device may transmit a peer discovery request and may thereafter detect a peer detection signal or a peer discovery response from at least one other device. In another design of the pull mode, the device may receive a peer discovery request from another device and, in response, may transmit a peer detection signal, or may transmit the peer detection signal at a faster rate, or may transmit a peer discovery response, or a combination thereof.

In yet another aspect, a device may perform event-triggered peer discovery (e.g., for the pull mode). In one design, the device may detect an event triggering a peer discovery (e.g., a change in the location of the device). The device may transmit a peer discovery request upon detecting the event. The device may then detect a peer detection signal or a peer discovery response from at least one other device after transmitting the peer discovery request.

In yet another aspect, a device may perform peer discovery using both a downlink spectrum and an uplink spectrum. In one design, the device may perform a first peer discovery (e.g., for the push mode) based on the downlink spectrum. The device may also perform a second peer discovery (e.g., for the pull mode) based on the uplink spectrum.

In yet another aspect, a device may transmit a peer detection signal in a manner to improve detection and/or increase payload. In one design, the device may generate at least one signal (e.g., a beacon signal and/or some other signal) for peer discovery. The device may send a plurality of transmissions of the at least one signal to enable at least one other device to detect the device.

Various aspects and features of the disclosure are described in further detail below.

BRIEF DESCRIPTION OF THE DRAWINGS

FIG. 6 shows a process for performing event-triggered peer discovery.

FIG. 7 shows a process for performing peer discovery using both a downlink spectrum and an uplink spectrum.

FIG. 8 shows a process for transmitting a peer detection signal.

DETAILED DESCRIPTION

Techniques for performing peer discovery to enable P2P communication are described herein. These techniques may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11

(Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
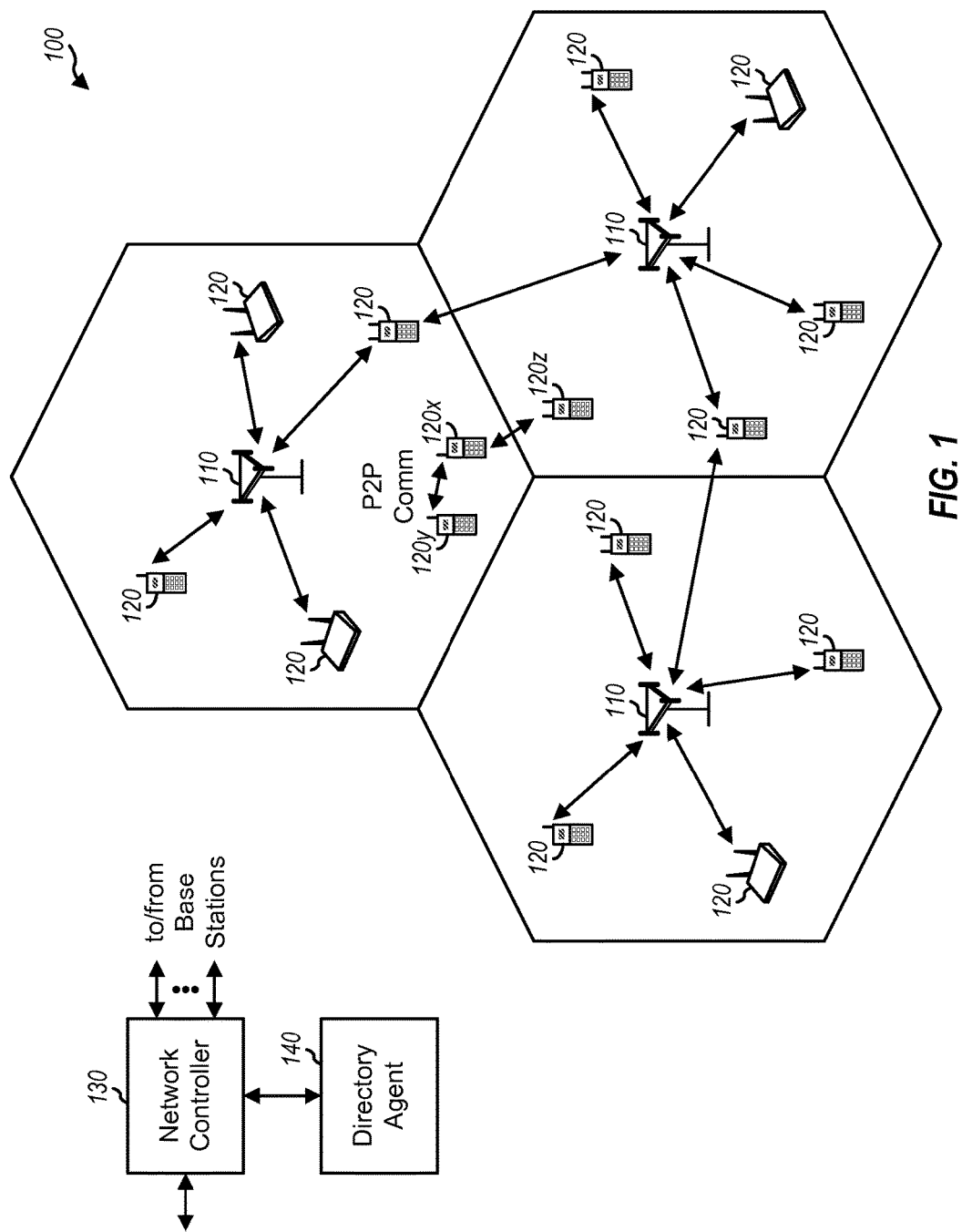
FIG. 1 shows a wireless communication network.

FIG. 1 shows a wireless communication network 100, which may be an LTE network or some other wireless network. Wireless network 100 may include a number of base stations 110 and other network entities. A base station may be an entity that communicates with the devices and may also be referred to as a Node B, an evolved Node B (eNB), an access point, etc. Each base station 110 may provide communication coverage for a particular geographic area and may support communication for the devices located within the coverage area. To improve network capacity, the overall coverage area of a base station may be partitioned into multiple (e.g., three) smaller areas. Each smaller area may be served by a respective base station subsystem. In 3GPP, the term "cell" can refer to a coverage area of a base station and/or a base station subsystem serving this coverage area, depending on the context in which the term is used.

A network controller 130 may couple to a set of base stations and may provide coordination and control for these base stations. Network controller 130 may be a single network entity or a collection of network entities. Network controller 130 may communicate with the base stations via a backhaul. The base stations may also communicate with one another, e.g., directly or indirectly via wireless or wireline backhaul. A directory agent 140 may couple to network controller 130 and/or other network entities. Directory agent 140 may also be part of network controller 130 or a base station. Directory agent 140 may support peer discovery by devices, as described below. Directory agent 140 may also be referred to by other names.

Devices 120 may be dispersed throughout the wireless network, and each device may be stationary or mobile. A device may also be referred to as a user equipment (UE), a user device, a mobile station, a terminal, an access terminal, a subscriber unit, a station, etc. A device may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, a peripheral device (e.g., a printer), etc. A device may communicate with a base station in the wireless network. A device may also communicate peer-to-peer with other devices. In the example shown in FIG. 1, devices 120x, 120y and 120z may communicate peer-to-peer, and remaining devices 120 may communicate with base stations 110. Devices engaging in P2P communication may be located within the same cell (e.g., devices 120x and 120y) or in different cells (e.g., devices 120x and 120z). Devices 120x, 120y and 120z may also be capable of communicating with base stations, e.g., when not engaged in P2P communication or possibly concurrent with P2P communication. P2P communication may be used to offload data traffic in order to reduce congestion on radio interface and a core network.

One challenge in P2P communication is discovery/detection of peer devices of interest within a particular range, e.g., within radio frequency (RF) proximity. A device may perform peer discovery to detect and identify other devices of interest within RF proximity. In may be desirable to perform peer discovery such that other devices of interest can be detected as efficiently as possible while reducing power consumption for peer discovery.

In an aspect, one or more hybrid modes may be supported for peer discovery. A hybrid mode may include multiple ways of performing peer discovery, which may result in better performance for peer discovery and/or lower battery consumption. In one design, one or more of the hybrid modes shown in Table 1 may be supported. Other hybrid modes for peer discovery may also be supported.

TABLE 1

Hybrid Modes

| Hybrid Mode | Description |
| --- | --- |
| Push & Pull Mode | Include both push mode and pull mode for peer discovery. |
| Autonomous & Assisted Mode | Include both autonomous peer discovery and network-assisted peer discovery. |

A device that can and/or desire to communicate peer-to-peer may perform peer discovery. For peer discovery, the device may (i) transmit a peer detection signal (PDS) to enable other devices to detect the device and/or (ii) receive peer detection signals from other devices. A peer detection signal may also be referred to as a peer discovery signal, a proximity detection signal, etc. A peer detection signal may comprise one or more signals that may carry identification information for a transmitter of the peer detection signal and/or other information.

Table 2 provides a short description of the different ways of performing peer discovery.

TABLE 2

| Mode | Description |
| --- | --- |
| Push Mode | A device transmits a peer detection signal and/or detects for peer detection signals. |
| Pull Mode | A device transmits a peer discovery request, which may trigger transmission of peer detection signals and/or peer discovery responses by other devices. |
| Autonomous | A device performs peer discovery by itself without assistance from a network. |
| Network-Assisted | A device performs peer discovery with assistance from a network. |

Autonomous peer discovery may be implemented with the push mode and/or the pull mode. For autonomous peer discovery based on the push mode, a device X may desire to be discovered and may occasionally (e.g., periodically or aperiodically) transmit its peer detection signal to advertise its presence. Correspondingly, a device Y may desire to discover other devices and may occasionally detect/search for peer detection signals from other devices. Device Y may detect and identify the peer detection signal from device X and may then be informed of the presence of device X. Device X may transmit its peer detection signal at a relatively low periodicity or rate in order to reduce power consumption and minimize impact to battery life. Similarly, device Y may detect for peer detection signals at a relatively low periodicity in order to minimize impact to battery life. In general, the periodicity of PDS transmission and/or PDS reception may be kept low to improve battery life. However, a low periodicity of PDS transmission and/or PDS reception would increase the latency of peer detection.

For autonomous peer discovery based on the pull mode, device X may desire to detect peer devices and/or services in its proximity and may then transmit a peer discovery request. The peer discovery request may be sent via a peer detection signal or some other signal and may also be referred to as a PDS request, a request PDS, etc. A peer discovery request may include one or more service identifiers (IDs) of one or more services and/or one or more device IDs of one or more peer devices that device X desires to detect. Peer device Y may receive the peer discovery request from device X and may determine whether the peer discovery request applies to device Y. This may be the case, for example, if peer device Y provides a service that is requested by device X and/or peer device Y is identified by the peer discovery request. If the peer discovery request applies, then peer device Y may begin transmitting its peer detection signal (if device Y was not already transmitting the signal) or may increase the rate of PDS transmissions, e.g., for a predetermined duration of time. Peer device Y may also send a peer discovery response for the peer discovery request. The pull mode for autonomous peer discovery may reduce battery consumption and/or latency associated with peer discovery.

Autonomous peer discovery based on the pull mode may be performed without network assistance, e.g., based on default time-frequency resources and a default PDS transmission and reception procedure. Peer discovery for the pull mode may also be performed with network assistance. In one design, device Y responding to a peer discovery request may communicate with device X transmitting the peer discovery request via a network to negotiate parameters to use for PDS transmission and reception. These parameters may include (i) designation of which device will transmit a peer detection signal and which device will receive the peer detection signal, (ii) time-frequency resources to use for transmission of the peer detection signal, (iii) a unique ID to help identify the peer detection signal, and/or (iv) other parameters. In another design, responding device Y may use the network to send a peer discovery response to indicate to requesting device X that the peer discovery request has been received and may skip transmitting a peer detection signal. The peer discovery response may include pertinent information such as the received signal strength of the peer discovery request measured by responding device Y, information of interest that might be asked for by the peer discovery request, etc. For example, requesting device X may send a peer discovery request asking all other devices that are on Facebook and within RF proximity to respond to the peer discovery request. Other devices may respond via the network and may provide additional information such as their 'busy' or 'available' status, etc. As another example, requesting device A may request for PDS transmission from all printers in an autonomous fashion and may send a peer discovery request for printers over the air. Device A may include various information such as its device ID in the peer discovery request. A printer device B may detect the peer discovery request from device A and may respond based on one of two options. In one option, device B may send a peer discovery response over the air so that device A can detect it. In another option, device B may contact device A via a wireless network (WAN), e.g., using the device ID of device A. Device B may also use network assistance, if needed, to determine the address of device A on the wireless network.

Figure 2:
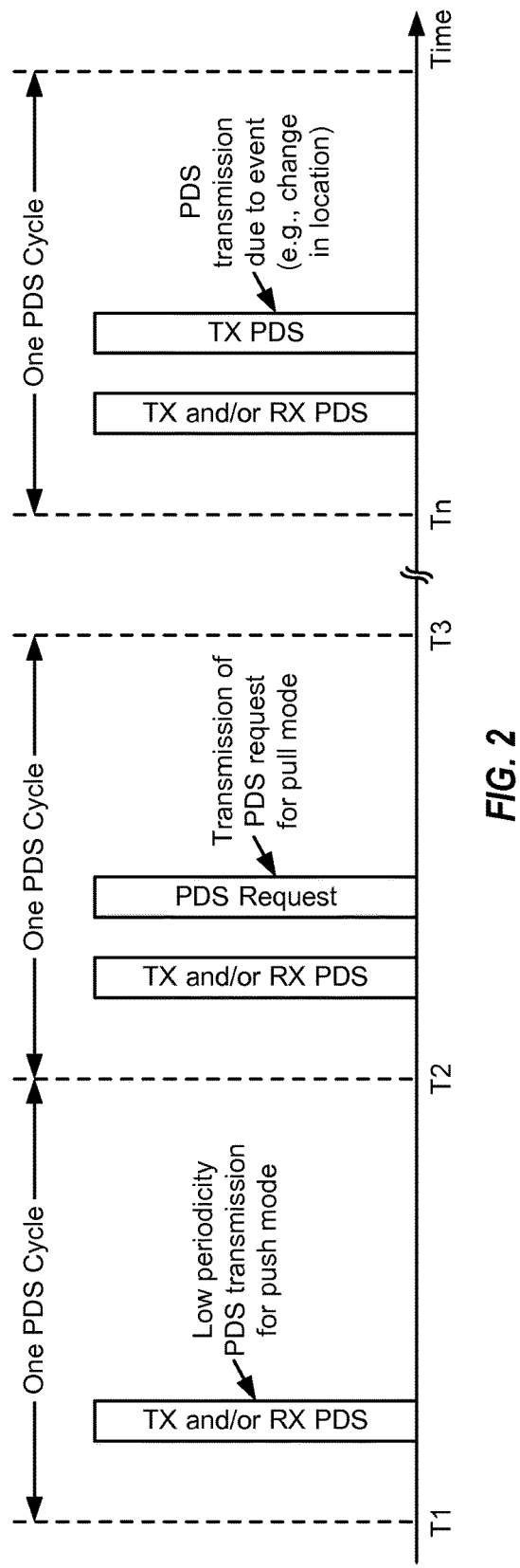
FIG. 2 shows autonomous peer discovery with the push mode and pull mode.

FIG. 2 shows a design of autonomous peer discovery with the push mode and the pull mode, which may be used separately (not shown in FIG. 2) or together (as shown in FIG. 2). For the push mode, a device may periodically transmit (broadcast or 'push') its peer detection signal at a particular rate, which may be a low periodicity. The device may transmit its peer detection signal in each time interval of $T_{PDS}$ seconds, which may be referred to as a PDS cycle. The device may also aperiodically transmit its peer detection signal, and $T_{PDS}$ may be dynamically adjusted for different PDS cycles. Alternatively or additionally, the device may occasionally detect for peer detection signals from other devices for the push mode. For the pull mode, the device may transmit (or 'pull') a peer discovery request whenever the device desires to detect peer devices and/or services in its proximity. The device may also detect a peer discovery request from another device and may respond by increasing the rate of PDS transmission.

In one design that is applicable for both the push mode and the pull mode, transmission of a peer detection signal or a peer discovery request may be triggered based on occurrence of certain events. For the push mode, a device may initiate transmission of its peer detection signal or may change the rate of its peer detection signal based on certain events. This may be referred to as event-driven PDS transmission. The PDS transmission may occur at anytime and may occur within a single PDS cycle or across multiple (e.g., two) consecutive PDS cycles. For the pull mode, the device may transmit a peer discovery request based on certain events. This may be referred to as event-driven peer discovery request transmission. Various types of events may be used as triggers for event-driven PDS/request transmission (i.e., event-driven PDS transmission and/or event-driven peer discovery request transmission).

In one design, events related to a change in the location of the device may be used as a trigger for event-driven PDS/request transmission. The terms "location" and "position" are often used interchangeably. The device may be interested in detecting peer devices within RF proximity. Hence, a change in the location of the device may result in a change in peer devices that are in RF proximity. The device may then perform peer discovery based on the push mode or the pull mode when a change in its location is detected.

A change in the location of the device may be detected in various manners and may not need to be accurately detected. In one design, the location of the device may be roughly estimated based on its serving cell, and a serving cell ID may be used to indicate the location of the device. The device may be deemed to have changed its location if a new serving cell is selected and may perform peer discovery based on the push mode or the pull mode when its serving cell changes. In another design, the location of the device may be determined based on RF finger printing. In this design, the device may measure the received signal strength of different cells and may determine that it has moved based on sufficient changes in the received signal strength of the cells and/or the identities of the cells. Detection of new femto cells, Wi-Fi access points, or other stationary peer devices (e.g., billboards) may also be used to detect a change in the location of the device. In yet another design, the location of the device may be determined based on GPS positioning, network-based positioning, etc. The device may determine that its location has changed based on its prior and current location. In yet another design, a change in the location of the device may be detected based on sensors on the device.

Such sensors may include accelerometers, gyroscopes, and/or other sensors for detecting speed, acceleration, etc. The sensors may be included in smart phones and other devices. The device may also detect for a change in its location in other manners.

In another design, events related to applications becoming active on the device may be used as a trigger for event-driven PDS/request transmission. For example, when an application becomes active, peer discovery based on the push mode or the pull mode may be performed to search for services required or provided by the application.

Event-driven PDS/request transmission may also be triggered based on other types of events. Event-driven PDS/request transmission may be calibrated to ensure good performance. For example, what constitutes a sufficient change in the location or the RF conditions of the device may be defined so that good performance can be obtained. It may be beneficial to incorporate the push mode with the pull mode and have an underlying occasional PDS transmission. In one design, the frequency of the occasional PDS transmission may be changed on demand when triggered by events.

Network-assisted peer discovery may be used to improve efficiency of PDS transmission and reception, which may reduce battery consumption and detection latency. For network-assisted peer discovery, a given device X may register with a directory agent (e.g., directory agent 140 in FIG. 1) so that the presence of device X and possibly other information about device X can be made known to the directory agent. The directory agent may collect similar information for other devices. The directory agent may notify device X when other devices of interest might be within the vicinity of device X. Device X may then perform peer discovery when notified by the directory agent. This may reduce power consumption for peer discovery and may also provide other benefits.

Figure 3:
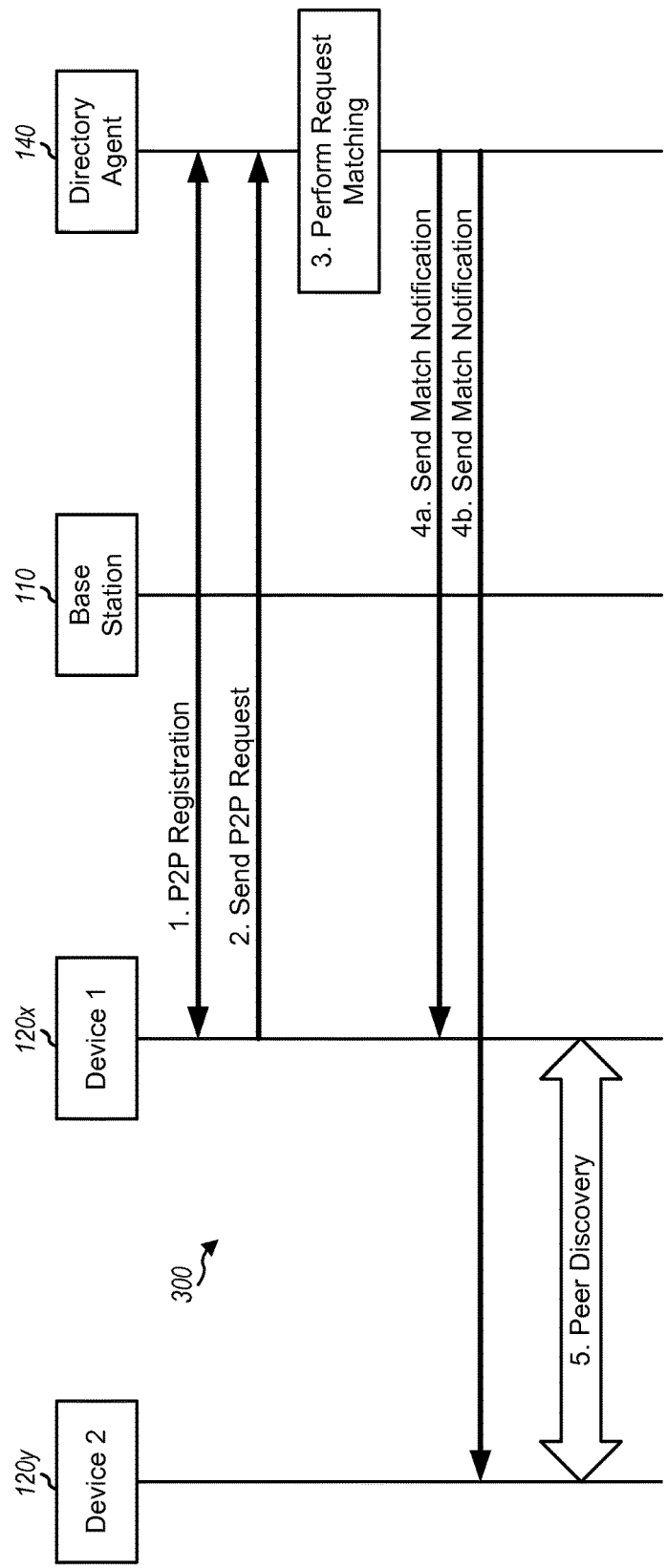
FIG. 3 shows a process for network-assisted peer discovery.

FIG. 3 shows a flow diagram of a design of a process 300 for network-assisted peer discovery. A device 120x may register itself with directory agent 140 upon entering wide area network (WAN) coverage, e.g., upon detecting a macro cell in wireless network 100 (step 1). Device 120x may provide pertinent information to directory agent 140 as part of the P2P registration. For example, device 120x may provide identification information for device 120x, service information for services requested by device 120x and/or services provided by device 120x, location information for device 120x, etc. Device 120x may perform P2P registration to advertise its services and/or to obtain services. In one design, device 120x may send a P2P request at the time of P2P registration (step 2). The P2P request may indicate services requested by device 120x and/or services provided by device 120x. Device 120x may submit a new P2P request or update an existing P2P request at any time after P2P registration. An updated P2P request may be sent due to a change in the operating status of device 120x, a change in the location of device 120x, a change in the battery status of device 120x, etc.

In general, a P2P request may be sent explicitly by device 120x or may be implicit and not sent. A P2P request may also be a transient request or a persistent request. A transient request may be valid for a predetermined time period, which may typically be a short duration. A persistent request may be valid for an extended time period or indefinitely until it is explicitly canceled by a requesting device. In one design, a P2P request may be associated with a time period in which the P2P request is valid and may be discarded after this time period.

Directory agent 140 may perform P2P registration of devices and may maintain a list of active P2P requests from these devices. Directory agent 140 may perform request matching, which may include examining the P2P requests from different devices and identifying devices with matching P2P requests (step 3). Request matching may be performed based on various criteria such as the services being requested or provided by the devices, the capabilities of the devices, the locations of the devices, etc. For example, a match may be declared between devices 120x and 120y due to device 120x providing a service that is requested by device 120y, or vice versa. A match may also require the two devices to be within RF proximity of one another, which may be determined based on the location information provided by the devices during P2P registration.

If a match is found for device 120x, then directory agent 140 may send a notification of the match to device 120x (step 4a). Directory agent 140 may also notify device 120y, which may be part of the match for device 120x(step 4b). The match notifications may inform devices 120x and 120y to initiate peer discovery, if needed. Devices 120x and 120y may perform peer discovery in response to receiving the match notifications from directory agent 140 (step 5). For peer discovery, device 120x may transmit a peer detection signal to enable device 120y to detect device 120x. Device 120x may also detect for a peer detection signal from device 120y. Devices 120x and 120y may perform peer discovery with or without assistance from the network.

FIG. 3 shows a specific design of network-assisted peer discovery using directory agent 140. Network-assisted peer discovery may also be performed in other manners.

Network-assisted peer discovery may be beneficial in various ways. Directory agent 140 may detect for matches, and peer discovery may be performed in response to detected matches. Devices requesting services, or providing services, and/or searching for other devices may register with directory agent 140. Directory agent 140 may then detect for matches between two or more devices. For example, device A may search for devices B, C and D, and device C may search for devices A, F and G. Directory agent 140 may identify a match for devices A and C and may inform these devices of the match. Since devices may perform peer discovery in response to detection of matches, network-assisted peer discovery may be considered as being based on the pull mode.

Two or more devices may be informed of a match and may perform peer discovery with network assistance. For example, devices A and C in the example above may contact each other via the network and may negotiate for any of the parameters described above for autonomous peer discovery based on the pull mode. The devices may also perform peer discovery without network assistance. In this case, peer discovery may be performed based on default time-frequency resources and a default procedure.

In general, a hybrid mode may include autonomous peer discovery and/or network-assisted peer discovery. A hybrid mode may also include peer discovery based on the push mode and/or the pull mode. In one design, a hybrid mode may include the following:

1. Autonomous peer discovery based on the push mode, and
2. Autonomous peer discovery or network-assisted peer discovery based on the pull mode.

For autonomous peer discovery based on the push mode, a device may occasionally transmit its peer detection signal regardless of whether or not there is a match from directory agent 140. This may be beneficial when the device desires to advertise its presence to a broad audience and battery consumption is not a concern, e.g. for billboards, mall stores, etc.

For autonomous peer discovery based on the pull mode, the device may transmit a peer discovery request when the device desires to detect peer devices and/or services in its proximity, as described above. The peer discovery request may trigger PDS transmission, or may increase the rate of PDS transmission, and/or may trigger transmission of peer discovery responses by other devices. For network-assisted peer discovery based on the pull mode, the device may register with directory agent 140 and may perform peer discovery when notified by directory agent 140 of a match.

The network may utilize TDD or FDD. For TDD, the downlink and uplink may share the same frequency channel, and downlink transmissions and uplink transmissions may be sent on the same frequency channel in different time periods. For FDD, the downlink and uplink may be allocated separate frequency channels, and downlink transmissions and uplink transmissions may be sent concurrently on the two frequency channels. The frequency channel used for the downlink may be referred to as a downlink spectrum, a downlink channel, a downlink carrier, etc. The frequency channel used for the uplink may be referred to as an uplink spectrum, an uplink channel, an uplink carrier, etc.

In general, in a FDD network, the downlink spectrum and/or the uplink spectrum may be used for autonomous peer discovery, network-assisted peer discovery, or hybrid peer discovery. If the downlink spectrum is used for PDS transmission, then a device can receive downlink signals from base stations and peer detection signals from other devices on the same downlink spectrum, without having to retune to listen for PDS transmissions.

In one design, the downlink spectrum and the uplink spectrum may both be used for peer discovery in the hybrid mode. The downlink spectrum may be used for autonomous peer discovery based on the push mode. For example, devices for billboards, mall stores, and restaurants may continuously advertise their presence on the downlink spectrum. The uplink spectrum may be used for network-assisted peer discovery based on the pull mode. A device may tune to the uplink spectrum and detect for PDS transmissions only when informed of a match. Thus, the device may continue to monitor for autonomous PDS transmissions on the downlink spectrum most of the time and may tune to the uplink spectrum only when needed. The uplink spectrum or the downlink spectrum may also be used for autonomous peer discovery based on the pull mode. For example, a device may send a peer discovery request on the downlink spectrum and may detect for peer detection signals on the downlink spectrum or the uplink spectrum.

A peer detection signal may be implemented in various manners. In one design, a peer detection signal may be implemented based on a beacon signal. A beacon signal may be transmitted in one or more symbol periods and may be transmitted on one subcarrier (or a few subcarriers) in each symbol period in which the beacon signal is transmitted. A symbol period in which the beacon signal is transmitted may be referred to as a beacon symbol period. A subcarrier on which the beacon signal is transmitted may be referred to as a beacon subcarrier. A beacon signal may comprise a beacon symbol in each beacon symbol period. A beacon symbol may be an orthogonal frequency division multiplex (OFDM) symbol, an SC-FDMA symbol, or some other transmission symbol having energy in one beacon subcarrier (or a few beacon subcarriers). A beacon symbol may also be referred to as a beacon. For clarity, much of the description below assumes one beacon subcarrier in each beacon symbol.

In one design, a beacon signal may comprise a single beacon symbol and may be transmitted in a single beacon symbol period. The location of the beacon subcarrier in this beacon symbol may be selected based on the information to send in the peer detection signal. For example, K subcarriers may be available for use, up to K device IDs may be defined, and each device ID may be mapped to a different subcarrier. The beacon subcarrier may then be selected based on the device ID of a device transmitting the beacon signal for the peer detection signal. The device ID may help to identify the transmitting device, possibly with assistance from the network or from an application that supports P2P functionality.

In another design, a beacon signal may comprise multiple beacon symbols and may be transmitted in multiple beacon symbol periods. The sequence of beacon symbols may be used to increase the size of the payload of the peer detection signal. The payload may carry a device ID, a service ID, and/or other information. In one design, the increased payload may be used to minimize collisions of device IDs by increasing the size of the device ID space. In another design, the increased payload may be used to send additional information in the peer detection signal. This additional information may include the services requested or provided by a device. In any case, the information to send in the peer detection signal may be used to select the beacon subcarrier in each beacon symbol. In one design, the information may be mapped to beacon subcarriers without encoding the information. In another design, the information may be encoded to obtain coded data, which may be used to select the beacon subcarriers. The information may be encoded based on a block code such as a Reed-Solomon code, a maximum distance separable (MDS) code, etc.

A beacon signal may be transmitted in a manner to avoid causing interference to other signals transmitted in a wireless network. For example, in LTE, the beacon signal may be transmitted to avoid interfering with a physical downlink control channel (PDCCH). The PDCCH may be transmitted in the first M symbol periods of a subframe, where M may be equal to 1, 2, 3, or 4 and may be configurable. The beacon signal may also be transmitted to avoid interfering with synchronization signals, a physical broadcast channel (PBCH), system information blocks (SIBs) such as SIB Type 1 (SIB1), and/or other transmissions from base stations.

In general, a beacon signal may be used for a peer detection signal for autonomous peer discovery and/or network-assisted peer discovery and also for the pull mode and/or the push mode. A beacon signal may be especially suitable for autonomous peer discovery based on the push mode.

A device may detect for beacon signals from other devices for peer discovery. In each beacon symbol period, the device may determine the received energy of each of the K subcarriers that can be used for the beacon signals. The device may compare the received energy of each subcarrier against a threshold and may declare a beacon subcarrier for each subcarrier on which the received energy exceeds the threshold. The device may identify the locations of the detected beacon subcarriers and may determine the information sent in the beacon signals based on the identified beacon subcarrier locations.

In another design, a peer detection signal may be implemented based on a sequence of signals. A set of K unique signals may be available for use for peer detection signals, where K may be any integer value. A peer detection signal may be defined by a sequence of N signals, where N may be any integer value. Each signal in the sequence of N signals may be selected from the set of K unique signals. A total of $K^N$ possible sequences of signals may be defined based on the set of K unique signals. A small subset of these $K^N$ possible sequences of signals may be used for peer detection signals in order to prevent confusion in identifying which sequence of signals corresponds to which device. A device may be assigned a particular sequence of signals for its peer detection signal and may be identified based on this sequence of signals. The device may send its sequence of signals for each transmission of its peer detection signal.

In yet another design, a peer detection signal may be implemented based on one or more signals used in a wireless network. For example, in LTE, a peer detection signal may be implemented based on a primary synchronization signal (PSS), or a secondary synchronization signal (SSS), or a reference signal, or some other signal, or a combination thereof. The synchronization signals and reference signal may be generated in different manners and may have different waveforms. A waveform may refer to a single instance or transmission of a particular signal (e.g., the PSS or SSS) or a set of signals (e.g., the PSS and SSS). A PSS/SSS transmission may refer to a transmission of the PSS, or the SSS, or both. In one design, a peer detection signal may include one PSS/SSS transmission. In another design, a peer detection signal may include multiple PSS/SSS transmissions.

In one design, the payload of a peer detection signal may be sent in at least one signal used for the peer detection signal. In this design, the payload may be sent in the beacon signal, or the PSS and/or the SSS, or the reference signal, etc. In another design, the payload (e.g., all or part of it) may be sent in one or more separate transmissions. For example, the payload may be sent in a SIB, a master information block (MIB), a physical downlink shared channel (PDSCH), etc. In one design, the payload may be sent in a single MIB, or SIB, or PDSCH transmission. In another design, the payload may be sent in a sequence of MIBs, with each MIB being associated with the same cell ID, to increase the payload. For example, the payload may be split over four MIBs. As another example, the payload may be sent in a sequence of PDSCH transmissions.

Figure 4:
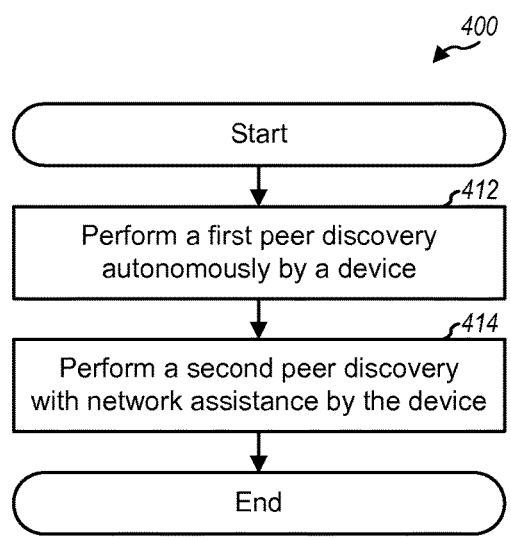
FIGS. 4 and 5 show two processes for performing peer discovery based on a hybrid mode.

FIG. 4 shows a design of a process 400 for performing peer discovery based on a hybrid mode that includes autonomous peer discovery and network-assisted peer discovery. Process 400 may be performed by a device (as described below) or by some other entity. The device may perform a first peer discovery autonomously, e.g., by occasionally transmitting a peer detection signal to enable at least one other device to detect the device and/or by occasionally detecting a peer detection signal from at least one other device (block 412).

The device may also perform a second peer discovery with network assistance (block 414). In one design, the device may register with a directory agent (or some other network entity) and may send information indicative of services requested and/or provided by the device. The device may also send other information to the directory agent. The device may receive a notification of a match between the device and at least one other device from the directory agent. The device may then perform the second peer discovery in response to receiving the notification of the match from the directory agent. In another design, the device may receive a peer discovery request from at least one other device and may send a peer discovery response to the peer discovery request via a wireless network.

Figure 5:
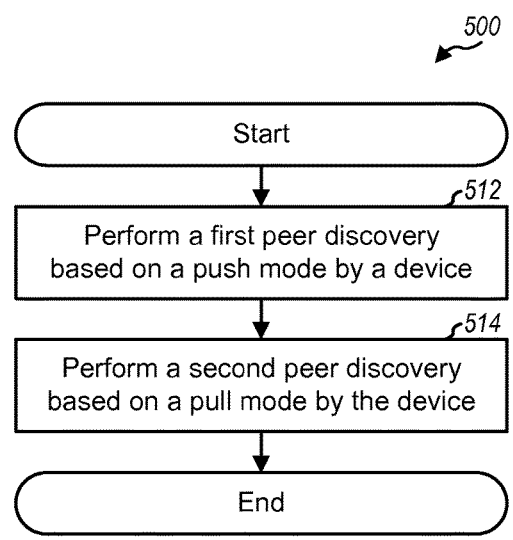

FIG. 5 shows a design of a process 500 for performing peer discovery based on a hybrid mode that includes a push mode and a pull mode. Process 500 may be performed by a device (as described below) or by some other entity. The device may perform a first peer discovery based on the push mode, e.g., by occasionally transmitting a peer detection signal and/or by occasionally detecting a peer detection signal from at least one other device (block 512). In general, the push mode may be characterized by occasional transmission and/or reception of peer detection signals.

The device may also perform a second peer discovery based on the pull mode (block 514). In one design, the device may transmit a peer discovery request and may thereafter detect a peer detection signal and/or a peer discovery response from at least one other device. In another design, the device may receive a peer discovery request from at least one other device and, in response, may transmit a peer detection signal or may transmit the peer detection signal at a faster rate. In another design, the device may receive a peer discovery request from at least one other device and may then send a peer discovery response (e.g., via a wireless network). In general, the pull mode may be characterized by transmission and/or reception of peer discovery requests and/or or other signals when triggered.

In one design, the device may autonomously perform peer discovery based on the push mode and the pull mode. In another design, the device may autonomously perform peer discovery based on the push mode and may perform peer discovery based on the pull mode with network assistance. In one design, the device may perform peer discovery on a downlink spectrum for the push mode and may perform peer discovery on an uplink spectrum for the pull mode. In another design, the device may perform peer discovery on the downlink spectrum or the uplink spectrum for both the push mode and the pull mode. The device may also perform peer discovery based on the push mode and the pull mode in other manners.

FIG. 6 shows a design of a process 600 for performing event-triggered peer discovery. Process 600 may be performed by a first device (as described below) or by some other entity. The first device may detect an event triggering peer discovery (block 612). The event triggering peer discovery may correspond to a change in the location of the first device, or an application becoming active on the first device, or reception of a match notification from a directory agent, or some other event, or a combination thereof. The first device may transmit a peer discovery request in response to detecting the event (block 614). The device may detect a peer detection signal and/or a peer discovery response from at least one other device after transmitting the peer discovery request (block 616). For example, the first device may detect a peer detection signal from at least one other device on a particular spectrum, e.g., the downlink spectrum or the uplink spectrum. Alternatively or additionally, the first device may receive a peer discovery response sent by at least one other device (e.g., via a network) in response to the peer discovery request.

The first device may also receive a peer discovery request from a second device. The first device may transmit a peer discovery response for the peer discovery request. Alternatively or additionally, the first device may initiate transmission of a peer detection signal or may transmit the peer detection signal at a faster rate in response to the peer discovery request.

FIG. 7 shows a design of a process 700 for performing peer discovery using both a downlink spectrum and an uplink spectrum. Process 700 may be performed by a device (as described below) or by some other entity. The device may perform a first peer discovery based on the downlink spectrum (block 712). In one design, the first peer discovery may be based on the push mode. The device may occasionally transmit a peer detection signal on the downlink spectrum and/or may occasionally detect a peer detection signal from at least one other device on the downlink spectrum.

The device may perform a second peer discovery based on the uplink spectrum (block 714). In one design, the second peer discovery may be based on the pull mode. The device may receive a notification to perform peer discovery from a directory agent and may perform the second peer discovery on the uplink spectrum in response to the notification. The device may also transmit a peer discovery request (e.g., on the downlink spectrum and/or the uplink spectrum) and may thereafter detect a peer detection signal on the uplink spectrum from at least one other device.

FIG. 8 shows a design of a process 800 for transmitting a peer detection signal. Process 800 may be performed by a device (as described below) or by some other entity. The device may generate at least one signal used for peer discovery (block 812). The device may send a plurality of transmissions of the at least one signal to enable at least one other device to detect the device (block 814).

In one design, the at least one signal may comprise a beacon signal. The plurality of transmissions of the at least one signal may correspond to a plurality of beacon symbols. Each beacon symbol may include (i) transmit power on at least one designated subcarrier among a plurality of subcarriers available for the beacon signal and (ii) no transmit power on remaining subcarriers. In another design, a set of signals may be available for use for peer discovery. Each of the plurality of transmissions may correspond to a transmission of one signal in the set of signals. The plurality of transmissions of the at least one signal may correspond to transmissions of a sequence of signals selected from the set of signals. In yet another design, the at least one signal may comprise a PSS, or a SSS, or a reference signal, or some other signal, or a combination thereof. In yet another design, the plurality of transmissions of the at least one signal may comprise a plurality of transmissions of a SIB, or a MIB, or a PDSCH, or some other information block, or some other channel.

Figure 9:
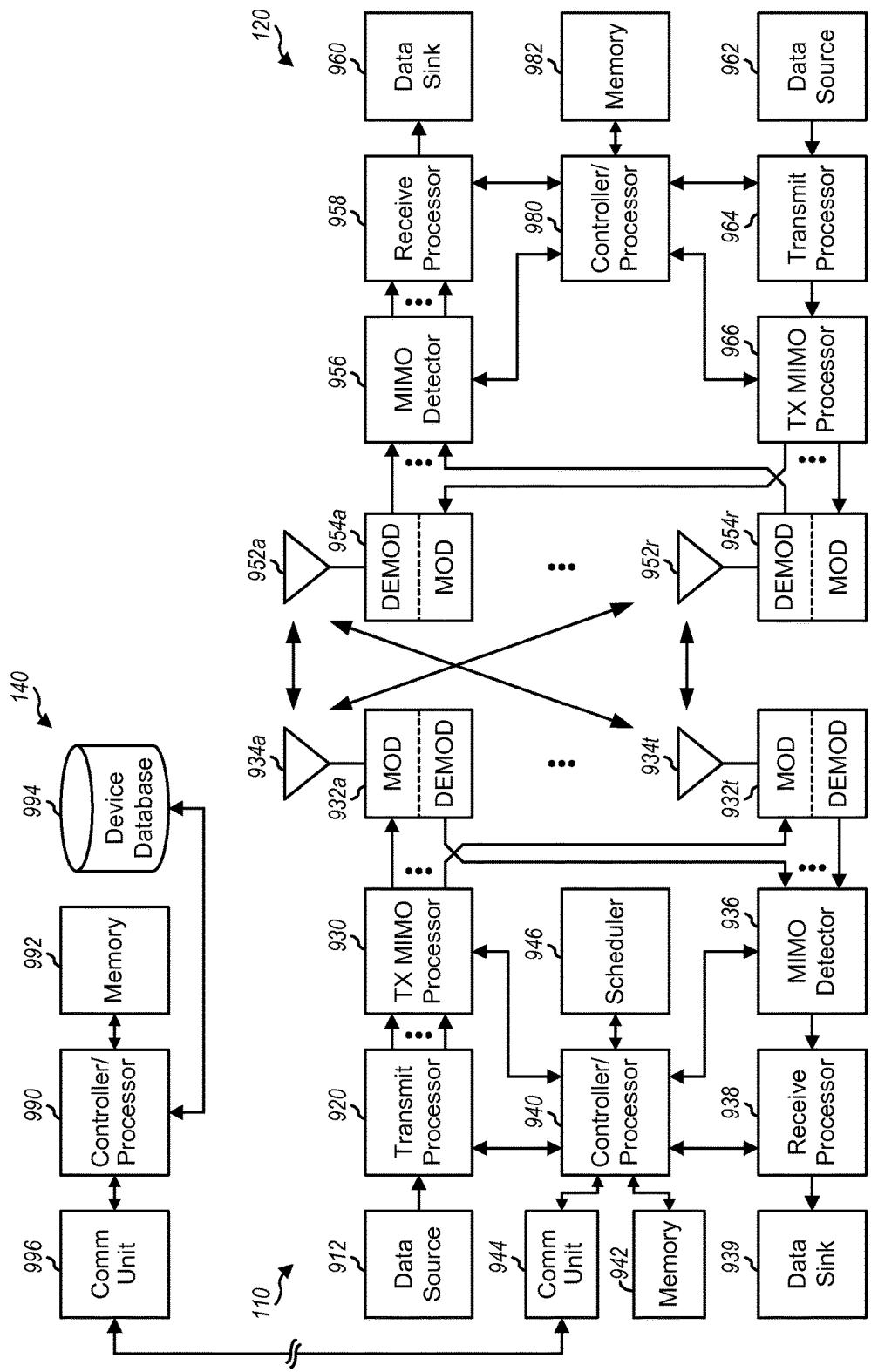
FIG. 9 shows a block diagram of a base station and a device.

FIG. 9 shows a block diagram of a design of a base station 110 and a device 120, which may be one of the base stations and one of the devices in FIG. 1. Base station 110 may be equipped with T antennas 934a through 934t, and device 120 may be equipped with R antennas 952a through 952r, where in general T≥1 and R≥1.

At base station 110, a transmit processor 920 may receive data for one or more devices from a data source 912 and control information (e.g., messages supporting peer discovery) from a controller/processor 940. Processor 920 may process (e.g., encode and modulate) the data and control information to obtain data symbols and control symbols, respectively. Processor 920 may also generate reference symbols for synchronization signals, reference signals, etc. A transmit (TX) multiple-input multiple-output (MIMO) processor 930 may perform spatial processing (e.g., precoding) on the data symbols, the control symbols, and/or the reference symbols, if applicable, and may provide T output symbol streams to T modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At device 120, antennas 952a through 952r may receive the downlink signals from base station 110, downlink signals from other base stations, and/or P2P signals from other devices and may provide received signals to demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate and decode) the detected symbols, provide decoded data for device 120 to a data sink 960, and provide decoded control information to a controller/processor 980.

On the uplink, at device 120, a transmit processor 964 may receive data from a data source 962 and control information (e.g., messages for peer discovery) from controller/processor 980. Processor 964 may process (e.g., encode and modulate) the data and control information to obtain data symbols and control symbols, respectively. Processor 964 may also generate symbols for a reference signal, a peer detection signal, a peer discovery request, a peer discovery response, etc. The symbols from transmit processor 964 may be precoded by a TX MIMO processor 966 if applicable, further processed by modulators 954a through 954r (e.g., for SC-FDM, OFDM, etc.), and transmitted to base station 110, other base stations, and/or other devices. At base station 110, the uplink signals from device 120 and other devices may be received by antennas 934, processed by demodulators 932, detected by a MIMO detector 936 if applicable, and further processed by a receive processor 938 to obtain decoded data and control information sent by device 120 and other devices. Processor 938 may provide the decoded data to a data sink 939 and the decoded control information to controller/processor 940.

Controllers/processors 940 and 980 may direct the operation at base station 110 and device 120, respectively. Processor 980 and/or other processors and modules at device 120 may perform or direct process 400 in FIG. 4, process 500 in FIG. 5, process 600 in FIG. 6, process 700 in FIG. 7, process 800 in FIG. 8, and/or other processes for the techniques described herein. Memories 942 and 982 may store data and program codes for base station 110 and device 120, respectively. A communication (Comm) unit 944 may enable base station 110 to communicate with other network entities. A scheduler 946 may schedule devices for data transmission on the downlink and/or uplink.

FIG. 9 also shows a design of directory agent 140, which may be a separate network entity as shown in FIG. 1 or may be located within base station 110 or some other network entity. Within directory agent 140, a controller/processor 990 may perform various functions to support peer discovery. Controller/processor 990 may perform P2P registration with devices, receive P2P requests from devices, perform request matching, and provide notifications of matches to initiate peer discovery by the matched devices. A memory 992 may store program codes and data for directory agent 140. A storage unit 994 may store information for devices that have registered with directory agent 140, P2P requests from the devices, etc. A communication unit 996 may enable directory agent 140 to communicate with other network entities.

Figure 10:
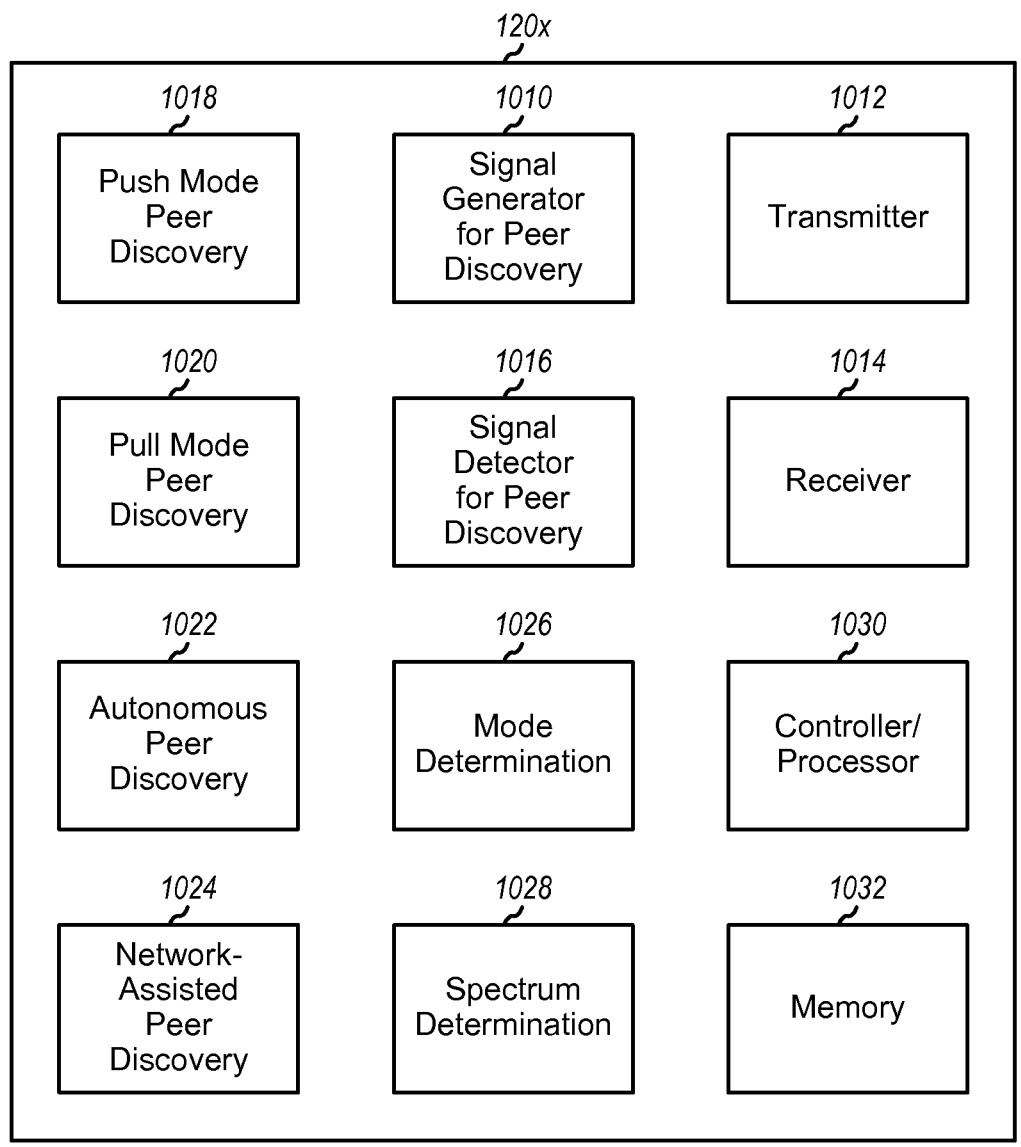
FIG. 10 shows a block diagram of another device.

FIG. 10 shows a block diagram of a design of a device 120*x* that supports peer discovery. Within device 120*x*, a module 1010 may generate a peer detection signal, a peer discovery request, a peer discovery response, and/or other signals to be transmitted by device 120*x* for peer discovery. A transmitter 1012 may transmit the signal, request, or response generated by module 1010. A receiver 1014 may receive signals transmitted by other devices. A module 1016 may detect a peer detection signal, a peer discovery request, a peer discovery response, and/or other signals transmitted by other devices for peer discovery. A module 1018 may perform peer discovery based on the push mode. A module 1020 may perform peer discovery based on the pull mode. A module 1022 may perform autonomous peer discovery. A module 1024 may perform peer discovery with network assistance. A module 1026 may select the push mode and/or the pull mode for peer discovery. Module 1026 may also determine whether to perform autonomous peer discovery and/or network-assisted peer discovery. A module 1028 may determine whether to perform peer discovery on an uplink spectrum and/or a downlink spectrum. The various modules within device 120*x* may operate as described above. A controller/processor 1030 may direct the operation of various modules within device 120*x*. A memory 1032 may store data and program codes for device 120*x*.

The modules within device 120*x* may comprise processors, electronic devices, hardware devices, electronic components, logical circuits, memories, software codes, firmware codes, etc., or any combination thereof.

In one configuration, apparatus 120 for wireless communication may include means for performing peer discovery autonomously, and means for performing peer discovery with network assistance.

In another configuration, apparatus 120 for wireless communication may include means for performing peer discovery based on a push mode, and means for performing peer discovery based on a pull mode.

In yet another configuration, apparatus 120 for wireless communication may include means for detecting an event triggering peer discovery by a device, means for transmitting a peer discovery request in response to detecting the event, and means for detecting for peer detection signals and/or peer discovery responses from other devices after transmitting the peer discovery request.

In yet another configuration, apparatus 120 for wireless communication may include means for performing first peer discovery (e.g., for the pull mode) based on downlink spectrum, and means for performing second peer discovery (e.g., for the push mode) based on uplink spectrum.

In yet another configuration, apparatus 120 for wireless communication may include means for generating at least one signal used for peer discovery, and means for sending a plurality of transmissions of the at least one signal by a device to enable other devices to detect the device.

In an aspect, the aforementioned means may comprise processor(s) 980, 958 and/or 964 at device 120, which may be configured to perform the functions recited by the aforementioned means. In another aspect, the aforementioned means may comprise one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   performing, by a device, a first peer discovery autonomously for detecting at least one other device, the first peer discovery performed during at least one peer discovery cycle, wherein the performing of the first peer discovery autonomously comprises sending a peer detection signal during the at least one peer discovery cycle at a first rate by the device; and
   performing, by the device, a second peer discovery with network assistance for detecting the at least one other device, the second peer discovery performed during the at least one peer discovery cycle, wherein the performing the second peer discovery comprises:
      sending a peer discovery request including at least one of a service identifier or a device identifier that the device desires to detect;
      receiving a second peer discovery request from the at least one other device; and
      sending the peer detection signal at a rate faster than the first rate by the device in response to the second peer discovery request, wherein the second peer discovery request is received and the peer detection signal is sent at the faster rate for a predetermined period of time, wherein one or more of the sending of the peer detection signal or the sending of the peer discovery request is initiated based on a change in serving cells by the device and sent via the network.

2. The method of claim 1, wherein the peer detection signal is to enable the at least one other device to detect the device.

3. The method of claim 1, wherein the performing the first peer discovery comprises periodically detecting a second peer detection signal from the at least one other device by the device.

4. The method of claim 1, wherein the performing the second peer discovery comprises:
   registering with a directory agent by the device; and
   performing the second peer discovery when notified by the directory agent.

5. The method of claim 4, wherein the performing the second peer discovery further comprises:
   sending to the directory agent information indicative of services requested or provided by the device;
   receiving from the directory agent a notification of a match between the device and the at least one other device; and
   performing the second peer discovery in response to receiving the notification of the match from the directory agent.

6. An apparatus for wireless communication, comprising:
   means for performing a first peer discovery autonomously for detecting at least one other device, the first peer discovery performed during at least one peer discovery cycle, wherein the means for performing the first peer discovery autonomously is configured to send a peer detection signal during the at least one peer discovery cycle at a first rate by the device; and
   means for performing a second peer discovery with network assistance for detecting the at least one other device, the second peer discovery performed during the at least one peer discovery cycle, wherein the means for performing the second peer discovery is configured to:
      send a peer discovery request including at least one of a service identifier or a device identifier that the device desires to detect;
      receive a second peer discovery request from the at least one other device; and
      send the peer detection signal at a rate faster than the first rate by the device in response to the second peer discovery request, wherein the second peer discovery request is received and the peer detection signal is sent at the faster rate for a predetermined period of time, wherein the peer detection signal is sent or the peer discovery request is sent based on a change in serving cells by the apparatus and sent via the network.

7. The apparatus of claim 6, wherein the peer detection signal is to enable the at least one other device to detect the apparatus.

8. The apparatus of claim 6, wherein the means for performing the first peer discovery is configured to periodically detect a second peer detection signal from the at least one other device by the apparatus.

9. The apparatus of claim 6, wherein the means for performing the second peer discovery is configured to
   register with a directory agent by the apparatus; and
   perform the second peer discovery when notified by the directory agent.

10. An apparatus for wireless communication, comprising:
    a memory; and
    at least one processor coupled to the memory and configured to:
       perform a first peer discovery autonomously for detecting at least one other device, the first peer discovery performed during at least one peer discovery cycle;
       perform a second peer discovery with network assistance for detecting the at least one other device, the second peer discovery performed during the at least one peer discovery cycle; and
       send a peer detection signal during the at least one peer discovery cycle at a first rate by the device, wherein the second peer discovery comprises:
          sending a peer discovery request including at least one of a service identifier or a device identifier that the device desires to detect;
          receiving a second peer discovery request from the at least one other device; and
          sending the peer detection signal at a rate faster than the first rate by the device in response to the second peer discovery request, and wherein the second peer discovery request is received and the peer detection signal is sent at the faster rate for a predetermined period of time, wherein one or more of the sending of the peer detection signal or the sending of the peer discovery request is initiated based on a change in serving cells by the device and sent via the network.

11. The apparatus of claim 10, wherein the peer detection signal is to enable the at least one other device to detect the apparatus.

12. The apparatus of claim 10, wherein the at least one processor is configured to periodically detect a second peer detection signal from the at least one other device by the apparatus.

13. The apparatus of claim 10, wherein the at least processor is configured to register with a directory agent by the apparatus and to perform the second peer discovery when notified by the directory agent.

14. A non-transitory computer-readable medium storing computer executable code for wireless communication, comprising code to:
perform, by a device, a first peer discovery autonomously for detecting at least one other device, the first peer discovery performed during at least one peer discovery cycle, wherein the code to perform the first peer discovery autonomously comprises code to send a peer detection signal during the at least one peer discovery cycle at a first rate by the device, and
perform, by the device, a second peer discovery with network assistance for detecting the at least one other device, the second peer discovery with network assistance being performed during the at least one peer discovery cycle, wherein the code to perform the second peer discovery comprises code to:
send a peer discovery request including at least one of a service identifier or a device identifier that the device desires to detect;
receive a second peer discovery request from the at least one other device; and
send the peer detection signal at a rate faster than the first rate by the device in response to the second peer discovery request, wherein the second peer discovery request is received and the peer detection signal is sent at the faster rate for a predetermined period of time, wherein one or more of the sending of the peer detection signal or the sending of the peer discovery request is initiated based on a change in serving cells by the device and sent via the network.

15. A method for wireless communication, comprising:
performing, by a device, a first peer discovery based on a push mode for detecting at least one other device, the first peer discovery performed during at least one peer discovery cycle, wherein the performing the first peer discovery comprises sending a peer detection signal during the at least one peer discovery cycle at a first rate by the device; and
performing, by the device, a second peer discovery based on a pull mode for detecting the at least one other device, the second peer discovery performed during the at least one peer discovery cycle, wherein the performing the second peer discovery comprises:
sending a peer discovery request including at least one of a service identifier or a device identifier that the device desires to detect;
receiving a second peer discovery request from the at least one other device; and
sending the peer detection signal at a rate faster than the first rate by the device in response to the second peer discovery request, wherein the second peer discovery request is received and the peer detection signal is sent at the faster rate for a predetermined period of time, wherein one or more of the sending of the peer detection signal or the sending of the peer discovery request is initiated based on a change in serving cells by the device and sent via a network.

16. The method of claim 15, wherein the peer detection signal is to enable the at least one other device to detect the device.

17. The method of claim 15, wherein the performing the first peer discovery comprises periodically detecting a second peer detection signal from the at least one other device by the device.

18. The method of claim 15, wherein the performing the second peer discovery comprises:
detecting a second peer detection signal or a peer discovery response from the at least one other device after transmitting the peer discovery request.

19. The method of claim 15, wherein the first peer discovery and the second peer discovery are performed autonomously by the device.

20. The method of claim 15, wherein the first peer discovery is performed autonomously by the device, and wherein the second peer discovery is performed with network assistance by the device.

21. The method of claim 15, wherein the performing the first peer discovery comprises performing the first peer discovery on a downlink spectrum, and wherein the performing the second peer discovery comprises performing the second peer discovery on an uplink spectrum.

22. An apparatus for wireless communication, comprising:
means for performing a first peer discovery based on a push mode for detecting at least one other device, the first peer discovery performed during at least one peer discovery cycle, wherein the means for performing the first peer discovery is configured to send a peer detection signal during the at least one peer discovery cycle at a first rate by the device; and
means for performing a second peer discovery based on a pull mode for detecting the at least one other device, the second peer discovery performed during the at least one peer discovery cycle, wherein the means for performing the second peer discovery is configured to:
send a peer discovery request including at least one of a service identifier or a device identifier that the device desires to detect;
receive a second peer discovery request from the at least one other device; and
send the peer detection signal at a rate faster than the first rate by the device in response to the second peer discovery request, wherein the second peer discovery request is received and the peer detection signal is sent at the faster rate for a predetermined period of time, wherein one or more of the sending of the peer detection signal or the sending of the peer discovery request is initiated based on a change in serving cells by the apparatus and sent via a network.

23. The apparatus of claim 22, wherein peer detection signal is to enable the at least one other device to detect the apparatus.

24. The apparatus of claim 22, wherein the means for performing the first peer discovery is configured to periodically detect a second peer detection signal from the at least one other device by the apparatus.

25. The apparatus of claim 22, wherein the means for performing the second peer discovery is configured to:
  detect a second peer detection signal or a peer discovery response from the at least one other device after transmitting the peer discovery request.

26. An apparatus for wireless communication, comprising:
  a memory; and
  at least one processor coupled to the memory and configured to:
    perform a first peer discovery based on a push mode for detecting at least one other device;
    perform a second peer discovery based on a pull mode for detecting the at least one other device,
    wherein the first peer discovery and the second peer discovery are performed during at least one peer discovery cycle, and wherein the first peer discovery comprises sending a peer detection signal during the at least one peer discovery cycle at a first rate by the device;
    wherein the second peer discovery comprises:
      sending a peer discovery request including at least one of a service identifier or a device identifier that the apparatus desires to detect;
      receiving a second peer discovery request from the at least one other device; and
      sending the peer detection signal at a rate faster than the first rate by the device in response to the second peer discovery request, wherein the second peer discovery request is received and the peer detection signal is sent at the faster rate for a predetermined period of time, wherein the peer detection signal is sent or the peer discovery request is sent based on a change in serving cells by the apparatus and sent via a network.

27. The apparatus of claim 26, wherein the peer detection signal is to enable the at least one other device to detect the apparatus.

28. The apparatus of claim 26, wherein the at least one processor is configured to periodically detect a second peer detection signal from the at least one other device by the apparatus.

29. The apparatus of claim 26, wherein the at least one processor is configured to detect a second peer detection signal or a peer discovery response from the at least one other device after transmitting the peer discovery request.

30. A non-transitory computer-readable medium storing computer executable code, comprising code to:
  perform, by a device, a first peer discovery based on a push mode for detecting at least one other device, the first peer discovery performed during at least one peer discovery cycle and comprising sending a peer detection signal during the at least one peer discovery cycle at a first rate by the device; and
  perform, by the device, a second peer discovery based on a pull mode for detecting the at least one other device, the second peer discovery performed during the at least one peer discovery cycle, wherein the code to perform the second peer discovery comprises code to:
    send a peer discovery request during the at least one peer discovery cycle, the peer discovery request including at least one of a service identifier or a device identifier that the device desires to detect;
    receive a second peer discovery request from the at least one other device; and
    send the peer detection signal at a rate faster than the first rate by the device in response to the second peer discovery request, wherein the second peer discovery request is received and the peer detection signal is sent at the faster rate for a predetermined period of time,
    wherein one or more of the sending of the peer detection signal or the sending of the peer discovery request is initiated based on a change in serving cells by the device and sent via a network.

31. A method for wireless communication, comprising:
  transmitting, during at least one peer discovery cycle, a peer discovery request for a peer detection signal by a first device for detecting at least one other device;
    detecting the peer detection signal or a peer discovery response from the at least one other device after transmitting the peer discovery request;
    transmitting, during the at least one peer discovery cycle, a second peer detection signal at an initial rate by the first device for detecting the at least one other device, receiving a second peer discovery request from a peer device; transmitting a response to the peer discovery request via a wireless network; and
    transmitting the second peer detection signal at a rate faster than the initial rate by the first device in response to the second peer discovery request,
    wherein the second peer discovery request is received and the second peer detection signal is transmitted at the faster rate for a predetermined period of time, and
    wherein the peer discovery request includes at least one of a service identifier or a device identifier that the device desires to detect,
    wherein the transmitting of the peer discovery request is initiated based on a change in serving cells by the first device and sent via the wireless network.

32. The method of claim 31, wherein the detecting the peer detection signal or the peer discovery response comprises receiving the peer discovery response sent by the at least one other device via a network in response to the peer discovery request.

33. An apparatus for wireless communication, comprising:
  means for transmitting, during at least one peer discovery cycle, a peer discovery request for a peer detection signal by a first device for detecting at least one other device;
  means for detecting the peer detection signal or a peer discovery response from the at least one other device after transmitting the peer discovery request;
  means for transmitting, during the at least one peer discovery cycle, a second peer detection signal at an initial rate by the first device for detecting the at least one other device^, means for receiving a second peer discovery request from a peer device; means for transmitting a response to the peer discovery request via a wireless network; and means for transmitting the second peer detection signal at a rate faster than the initial rate by the first device in response to the second peer discovery request,
  wherein the second peer discovery request is received and the second peer detection signal is transmitted at the faster rate for a predetermined period of time, and
  wherein the peer discovery request includes at least one of a service identifier or a device identifier that the device desires to detect,
  wherein the peer discovery request is transmitted based on a change in serving cells by the first device and sent via the wireless network.

34. An apparatus for wireless communication, comprising: a memory; and at least one processor coupled to the memory and configured to:
  transmit, during at least one peer discovery cycle, a peer discovery request for a peer detection signal by a first device for detecting at least one other device,
  detect the peer detection signal or a peer discovery response from the at least one other device after sending the peer discovery request,
  transmit, during the at least one peer discovery cycle, a second peer detection signal at an initial rate by the first device for detecting the at least one other device, to receive a second peer discovery request from a peer device,
  transmit a response to the peer discovery request via a wireless network, and transmit the second peer detection signal at a rate faster than the initial rate by the first device in response to the second peer discovery request, wherein the second peer discovery request is received and the second peer detection signal is transmitted at the faster rate for a predetermined period of time, wherein the peer discovery request includes at least one of a service identifier or a device identifier that the device desires to detect, and
  wherein the peer discovery request is transmitted based on a change in serving cells by the first device and sent via the wireless network.

35. A non-transitory computer-readable medium storing computer executable code, comprising code to:
  transmit, during at least one peer discovery cycle, a peer discovery request for a peer detection signal by a first device for detecting at least one other device,
  detect the peer detection signal or a peer discovery response from the at least one other device after sending the peer discovery request,
  transmit, during the at least one peer discovery cycle, a second peer detection signal at an initial rate by the first device for detecting the at least one other device^
  receive a second peer discovery request from a peer device, transmit a response to the peer discovery request via a wireless network, and transmit the second peer detection signal at a rate faster than the initial rate by the first device in response to the second peer discovery request,
  wherein the second peer discovery request is received and the second peer detection signal is transmitted at the faster rate for a predetermined period of time,
  wherein the peer discovery request includes at least one of a service identifier or a device identifier that the device desires to detect, and
  wherein the peer discovery request is transmitted based on a change in serving cells by the first device and sent via the wireless network.

36. The method of claim 1, wherein the performing the second peer discovery comprises:
  receiving a peer discovery request from at least one other device; and sending a response to the peer discovery request via a wireless network.

37. The method of claim 1, further comprising:
  sending another peer discovery request based on a change in a battery status of the device.

38. The method of claim 1, wherein the at least one of the transmitting of the peer detection request or the transmitting the second peer detection signal is initiated further based on reception of a notification of a match from a directory agent.

* * * * *